United States Patent Office

3,697,332
Patented Oct. 10, 1972

3,697,332
METHOD FOR COATING ALUMINUM WHILE AVOIDING OBJECTIONABLE WASTES
Mark A. Kuehner, North Hills, Pa., assignor to Amchem Products, Inc., Ambler, Pa.
No Drawing. Filed Feb. 11, 1971, Ser. No. 114,667
Int. Cl. C23f 7/14
U.S. Cl. 148—6.15 R
5 Claims

ABSTRACT OF THE DISCLOSURE

Aluminum surfaces with good corrosion resistance and paint adhesion properties, together with a waste liquid substantially free of objectionable ions are produced when the aluminum is treated with a solution of phosphate, molybdate, and fluoride, and when the waste stream is rendered basic with lime (pH 11) and then neutralized with sulphuric acid (pH 7).

---

This invention relates to the art of coating aluminum to enhance its corrosion resistance and paint adhesion properties. It is particularly concerned with the production of coated aluminum in a manner such that the liquid waste resulting from the coating producing operation is free of objectionable ions and thus not a pollutant.

The most widely used chemical coating systems for aluminum heretofore have been based upon chromic acid solutions. One general type produces a chromate coating from a bath containing hexavalent chromium, fluoride, and preferably an accelerator, such as ferricyanide. Another general type of coating system produces a chromate-phosphate coating on the aluminum from a bath containing phosphate, hexavalent chromium, and fluoride. Both types of treatment yield excellent results from a performance standpoint, but they also yield waste solutions containing hexavalent chromium. Hexavalent chromium is a troublesome pollutant; even at high dilutions it kills bacteria systems commonly employed in sewage disposal plants. It is also toxic to humans. For these reasons, it is necessary to treat the liquid waste from chromic acid based treating systems to remove the hexavalent chromium. The waste treatment operation is relatively troublesome, since it involves an oxidation-reduction reaction which must be controlled very carefully to insure complete removal of the hexavalent chromium.

Occasionally, phosphate coating baths, similar to those used to produce iron phosphate coatings on steel, are used in the treatment of aluminum. Such baths commonly include phosphate and a variety of other components, including surface active components. They have not been widely used on aluminum for the reason that they are designed principally as steel treating systems, and are not tailored to sustain high production rates on aluminum with good uniformity of coating quality.

Similarly, zinc phosphate coating baths designed principally for use on steel have occasionally been used to coat aluminum. But this use has also been of an auxiliary type, for instance, in those cases where an object being coated has both steel parts and aluminum parts.

While the two types of phosphate baths mentioned ordinarily contain no hexavalent chromium, they none-the-less present a variety of waste disposal problems which vary with the particular composition being employed.

In accordance with the present invention, a method is provided for producing a phosphate coating on aluminum which enhances its corrosion resistance and its paint adhesion properties, which method is suitable for high production operations, and yields, in a simple two-step pH adjusting treatment, a waste liquid which not only contains no hexavalent chromium, but which is substantially free of all objectionable ions.

The coating solution employed in the method of the present invention includes phosphate ion as a coating forming material, molybdate ion as an accelerator, and fluoride ion as an aluminum complexing agent to prevent degradation of the performance of the bath by reason of accumulations of dissolved aluminum during the course of use. In accordance with the method the bath is operated at a pH between about 3.0 and 5.5. As portions of the bath leave the region of use (in manners discussed below) as waste, they contain phosphtae ion, aluminum fluoride complex, molybdate ion, hydrogen ion and one or more cations such as sodium or ammonium, the waste stream being mildly acid. In accordance with the invention, the waste stream is first raised in pH to a level of approximately pH 11 by the addition of calcium hydroxide (lime). This results in the precipitation from the waste stream of calcium phosphate, aluminum hydroxide, calcium fluoride, and calcium molybdate. In the waste liquid following its separation from these precipitates, the only ions present in appreciable amounts are calcium ions, hydroxyl ions, sodium and ammonium ions. The pH of the waste stream is then reduced to the neutral level of pH 7 by the addition of sulphuric acid. In this manner the calcium ions are precipitated from the solution as calcium sulfate, and after separation of the liquid from the precipitate the final waste stream is substantially free of all objectionable ions, containing only a cation such as sodium, some sulfate ions, and perhaps a small quantity of phosphate ions. The final waste stream is pure enough for discharge to a plant sewer system, to a municipal sewer system, for secondary use within the plant, or for secondary-subsidiary treatment such as deionization through ion exchangers.

The invention may be practiced on coating lines using any of the three most widely employed high production modes of applying the coating solution to the metal: spray coating, immersion coating, and reverse roll coating. The optimum proportions of ingredients and operating conditions vary somewhat with the mode of application, and the way in which the waste stream is formed varies also. In spray and immersion-type operations, part of the treating bath is more or less continuously dragged out of the treating tank or spray cabinet on the treated aluminum work while the remainder is reused, with appropriate replenishment. When the treated surfaces are rinsed with water in the next conventional step, the waste stream is formed from the water and dragged out solution, and is ready for the above-described pH adjustment treatment which precipitates the objectionable ions. In the reverse roll coating mode of operation the treating solution is not recycled but is applied to the aluminum surface, allowed to dwell there a selected time interval, and then is in large part removed by squeegee rolls. The aluminum is then ordinarily rinsed, and the rinse solution is combined with the spent treating solution squeegeed from the surface to form the waste stream for pH adjustment treatment.

From the foregoing it can be seen that the principal object of the present invention is to provide a method of producing coated aluminum having corrosion resistance and paint adhesion properties comparable to those resulting from chromate and chromate-phosphate-type coating methods, together with a waste solution containing no hexavalent chromium, and in fact, containing no objectionable ions whatever.

As pointed out above, the optimum proportions of ingredients in accordance with the method of the invention vary somewhat depending upon the mode of application employed. However, generally speaking, it is preferred that the treating bath contain phosphate from about .3% to about 3.5% by weight (calculated as 75% phosphoric acid), molybdate from about .01% to about 2% by weight (calculated as molybdate ion), and fluoride from about .01% to about 1.0% by weight (calculated as fluoride ion).

A suitable concentrate for use after dilution in a spray-type operation for aluminum parts has the following composition:

FORMULA I

| | Percent by weight |
|---|---|
| 75% phosphoric acid | 15 |
| 50% caustic soda | 9.2 |
| Sodium molybdate | 0.9 |
| Sodium bifluoride | 1.4 |
| Water | Balance |

The foregoing concentrate is diluted for use in a proportion of from about 2 to about 8 parts concentrate to about 100 parts water. At use concentration the pH will be from about 4.2 to about 4.8. The preferred operating temperature lies in the range between about 105° and about 140° F., and the spray contact time may be varied between about 30 seconds and about 5 minutes.

A suitable concentrate for use in a high-speed spray type strip line operation or for use in a reverse roll type operation has the following composition:

FORMULA II

| | Percent by weight |
|---|---|
| 75% phosphoric acid | 14.6 |
| Ammonium hydroxide (26° Bé.) | 5.2 |
| Molybdic acid (84% $MoO_3$) | 7.7 |
| Ammonium bifluoride | 10.3 |
| Water | Balance |

The concentrate of Formula II is diluted for use in a proportion of from about 5 to about 25 parts concentrate to about 100 parts water. At use concentration the pH will be from about 3.7 to about 4.3. When used in a reverse roll coat system the contact time with the aluminum strip should be at least 5 seconds and the operating temperature should be held between about 80° and about 120° F.

It will be noted from a comparison of Formulas I and II and the operating preferences outlined above that when the method is practiced under short contact time conditions, such as a spray strip line or reverse roll coat strip line, it is done so at a lower pH and with a considerably higher concentration of molybdate and fluoride in the treating solution.

Another concentrate for use after dilution in a spray-type operation for aluminum parts has the following composition:

FORMULA III

| | Percent by weight |
|---|---|
| 75% phosphoric acid | 13.4 |
| 50% caustic soda | 3.4 |
| Sodium molybdate | 8.8 |
| Sodium bifluoride | 1.7 |
| Water | Balance |

The considerations underlying the broad ranges of concentrations at final bath dilution pointed out above are as follows. If the concentration of phosphate is too high, the coatings tend to be objectionably powdery; if the phosphate concentration is too low, the coating weight will tend to be too light. The molybdate concentration is of special importance, and the lowest suitable concentration is related to the coating time involved in the operation. The shorter the coating time, the greater the concentration of molybdate must be. At the same time it is desired to keep the molybdate concentration as low as possible for reasons of economy.

The fluoride concentration should be sufficient to complex the aluminum which is dissolved from the surfaces in the course of operations. When initially preparing the treating bath, a complex fluoride can be employed but it is preferred to replenish with simple fluoride as aluminum is being dissolved in the coating process.

It can be seen from the foregoing formulas that the cations employed are sodium and ammonium. For many applications, the use of sodium cations is preferred over the use of ammonium, because equally good coating results are obtainable and, as will be explained, ammonium cations complicate the optimum practice of the pollution control aspect of the invention. However, in some cases, such as high speed spray strip lines and reverse roll coat-type operations (both involving very short contact times), the sodium fluoride salts are not sufficiently soluble to provide sufficient fluoride ion to the treating bath, thereby necessitating the use of ammonium fluoride salt. When the waste stream from an ammonium containing bath is rendered basic by the addition of lime, ammonia gas is freed from the waste stream. The ammonia gas must be disposed of or handled so that it does not cause an air pollution problem. For the foregoing reasons it is preferred that the invention be practiced by the use of sodium cations whenever possible.

According to prior art practice, phosphate coating baths used for aluminum or used for both aluminum and iron, contain surface active components to perform a cleaning function conjointly with the coating function. In accordance with the method of the present invention, such components are not used in the coating bath so that their presence as objectionable pollutants in the waste stream is avoided.

Despite the permissible variations in coating bath proportions, operating conditions, and mode of application involved in the method aspect of the invention, the waste stream produced contains at the outset only phosphate, aluminum fluoride complex, molybdate, hydrogen ion, and cations such as ammonium or sodium. The mildly acid waste stream is then rendered basic by the addition of calcium hydroxide (lime). Sufficient lime is added to raise the pH to about 11. The pH should not be raised to a higher level, because the amphoteric nature of aluminum would cause the redissolution of aluminum ions. The addition of lime can be readily controlled by means of pH measurements. After such addition, the waste stream is agitated and then passed to a settling vessel where the precipitates of calcium phosphate, aluminum hydroxide, calcium fluoride, and calcium molybdate settle from the solution. The flocculant, gelatinous character of the aluminum hydroxide aids in carrying down the other precipitates. The clear basic solution is then withdrawn from the settling vessel and delivered to another station where sulphuric acid is added with agitation to lower the pH to a neutral point of 7. Once again, control of acid addition is readily effected by pH measurements. The neutralized waste stream is then delivered to another settling vessel where the insoluble calcium sulphate drops from the solution. The neutral waste stream containing only minor amounts of sodium, or ammonium sulphate, and perhaps phosphate, is withdrawn from the settling vessel for discharge, reuse or further treatment.

The effectiveness of the method in achieving the object of producing good quality coated aluminum having enhanced corrosion resistance and paint adhesion properties is illustrated by the data reported in Table I below, resulting from tests on aluminum panels which were coated, painted and subjected to salt spray.

TABLE I

| | | | 250 hr. acid salt spray test | |
|---|---|---|---|---|
| Formula | Appln. method | Coating temp. ° F. | Scribe blistering | Tape loss |
| I | Spray | 75 | Slight | Very slight. |
| I | do | 110 | do | Do. |
| IV | do | 110 | do | Do. |
| Blank* | | | Moderate | Total. |
| II | Reverse roll coat | Room | None | Very slight. |
| V | do | Room | Slight | Slight. |

*Cleaned, painted, and subjected to salt spray.

Formula IV in Table I is a standard prior art chromate phosphate-type coating solution containing chromate, phosphate, and fluoride. Formula V is a standard prior art chromate type solution containing chromate, fluoride, and ferricyanide. In the above test work the spray times in all cases were one minute, and the reverse roll coat contact times were in all cases 5 seconds. The acid salt spray tests and evaluation method followed standard procedures. All of the panels involved in the tests were painted with the same type of paint before being subjected to salt spray.

I claim:

1. A method for producing aluminum surfaces with enhanced corrosion resistance and paint adhesion properties and for producing a by-product waste liquid substantially free of objectionable ions, said method comprising: Contacting said surfaces with an aqueous solution consisting essentially of from about .3% to about 3.5% by weight phosphate, from about .01% to about 1.0% by weight fluoride, and from about .01% to about 2.0% by weight molybdate, said solution having a pH from about 3.0 to about 5.5, thereby forming a phosphate coating on said surfaces; collecting used portions of said aqueous solution into a waste stream for ion removal treatment; raising the pH of said waste stream to about 11 by additions of lime thereto, thereby precipitating calcium phosphate, aluminum hydroxide, calcium fluoride, and calcium molybdate from said waste stream; separating said precipitates from said waste stream while its pH is about 11; reducing the pH of said waste stream to about 7 by adding sulphuric acid thereto, thereby precipitating calcium sulphate from the waste stream; separating said precipitates from the waste stream while its pH is about 7; and discharging said waste stream.

2. A method according to claim 1 wherein the cations in said solution consist of sodium and hydrogen.

3. A method according to claim 1 wherein the cations in said solution consist of ammonium and hydrogen.

4. A method according to claim 1 wherein the time of contact between said surfaces and said aqueous solution is less than 30 seconds wherein the concentration of said molybdate is at least 0.3% by weight, and wherein said pH is between about 3.7 and about 4.3.

5. A method according to claim 4 wherein the cations in said solution are ammonium and hydrogen.

References Cited

UNITED STATES PATENTS

| | | | |
|---|---|---|---|
| 2,234,206 | 3/1941 | Thompson | 148—6.15 RX |
| 2,312,855 | 3/1943 | Thompson | 148—6.15 Z |
| 2,502,441 | 4/1950 | Dodd et al. | 148—6.27 X |
| 2,557,509 | 6/1951 | Miller | 148—6.15 RX |
| 2,839,439 | 6/1958 | Stapleton | 148—6.15 R |
| 3,247,791 | 4/1966 | Leonard | 148—6.27 X |
| 3,562,015 | 2/1971 | Lancy | 134—13 |

OTHER REFERENCES

Gurnham: Principles of Industrial Waste Treatment, 1955, John Wiley and Sons Inc., pp. 177, 178, 189, 190.

RALPH S. KENDALL, Primary Examiner

U.S. Cl. X.R.

134—13; 248—6.15 Z, 6.27

UNITED STATES PATENT OFFICE
CERTIFICATE OF CORRECTION

Patent No. 3,697,332      Dated October 10, 1972

Inventor(s)    Mark A. Kuehner

It is certified that error appears in the above-identified patent and that said Letters Patent are hereby corrected as shown below:

IN THE SPECIFICATION

Column 2, line 10, "phosphtae" should read --phosphate--.

Column 4, Table 1, in the column headed "Coating temp. °F.", third entry, "110" should read --100--.

IN THE CLAIMS

Column 5, line 20, "3,0" should read --3.0--.

Signed and sealed this 29th day of May 1973.

(SEAL)
Attest:

EDWARD M. FLETCHER, JR.
Attesting Officer

ROBERT GOTTSCHALK
Commissioner of Patents

FORM PO-1050 (10-69)